UNITED STATES PATENT OFFICE.

GEORGE E. RICE, OF BOSTON, MASSACHUSETTS.

DISINFECTANT.

SPECIFICATION forming part of Letters Patent No. 289,852, dated December 11, 1883.

Application filed October 20, 1883. (No specimens.)

*To all whom it may concern:*

Be it known that I, GEORGE E. RICE, of Boston, in the county of Suffolk and State of Massachusetts, have invented an Improved Disinfecting Compound; and I hereby declare that the following is a full, clear, and exact description thereof.

To provide an effective antiseptic and deodorizer which shall also be anti-corrosive is the object of this invention, a disinfecting compound possessing these properties being particularly adapted for general sanitary uses in water-closets, sinks, cesspools, hospitals, dissecting-rooms, houses heated by furnaces, holds of vessels, &c.

To enable others skilled in such matters to understand how my disinfectant is made, I will proceed to enumerate the ingredients of which it is composed and about the proportions and general manner of compounding the same.

I place within a receptacle about seventy-five (75) parts of ground pipe-clay (the purest form of alumina) free from metallic oxides, and add thereto a solution of about eight (8) parts of creosote or phenol and two (2) parts of caustic soda. Next I add to the above about four (4) parts of the sulphate of iron and four (4) parts of the chloride of zinc and about eight (8) parts of the sulphite of lime, soda, or magnesia, and thoroughly mix and incorporate the several ingredients by stirring or otherwise.

A small quantity of ground gypsum may be used for facilitating the drying of the compound, which, in a pulverulent state, is then ready to be put up for use.

The gypsum may be omitted and the compound dried by natural or artificial heat or by forcing currents of air through it.

Instead of four parts of sulphate of iron and four parts of chloride of zinc, I may employ eight parts of sulphate of iron only or eight parts of chloride of zinc only.

The proportions of the ingredients herein named are not arbitrary, as a good result may be obtained by changing them somewhat. The pipe-clay is an absorber of noxious gases and forms the base of the compound.

The phenol or creosote is the effective antiseptic agent which prevents putrefaction and also checks the same where it has commenced.

The sulphate of iron and the chloride of zinc deodorize excremental and other foul matter, the chloride of zinc being peculiarly fitted as a deodorizer of ammoniacal gases.

The function of the sulphite is to aid the process of deodorizing and prevent the corrosion or oxidation of the objects upon which the disinfectant is applied.

I am aware that many or perhaps all of the ingredients herein enumerated have been employed in some way for disinfecting purposes; but my within-described invention is essentially for the combination of said ingredients to produce a new disinfecting compound.

I claim—

A disinfecting compound consisting, essentially, of pipe-clay, phenol, caustic soda, sulphate of iron, chloride of zinc, and a sulphite of lime, or its equivalent, mixed in about the proportions set forth.

Witness my hand this 15th day of October, 1883.

GEO. E. RICE.

Witnesses:
N. W. STEARNS,
JAS. W. CHAPMAN.